United States Patent [19]
Vauchel

[11] Patent Number: 5,947,625
[45] Date of Patent: Sep. 7, 1999

[54] PIVOT ATTACHMENT FOR A MOVABLE THRUST REVERSER ELEMENT

[75] Inventor: Guy Bernard Vauchel, Le Havre, France

[73] Assignee: Societe Hispano-Suiza, Paris, France

[21] Appl. No.: 08/997,506

[22] Filed: Dec. 23, 1997

[30] Foreign Application Priority Data

Dec. 26, 1996 [FR] France .................................. 96 16031

[51] Int. Cl.$^6$ ................................................. B64C 15/06
[52] U.S. Cl. .............................. 403/24; 403/77; 403/128; 244/12.5; 384/208; 60/226.2
[58] Field of Search ............................... 244/73 C, 12.5; 403/76, 78, 77, 90, 359.1, 359.6, 122, 128, 298; 384/208, 206, 906; 60/226.2

[56] References Cited

U.S. PATENT DOCUMENTS

| | | | |
|---|---|---|---|
| 2,974,986 | 3/1961 | Hazard | 403/76 |
| 3,482,890 | 12/1969 | Burrell | 384/208 |
| 3,856,239 | 12/1974 | Leibach | 244/12.5 |
| 4,552,309 | 11/1985 | Szuminski et al. | 244/12.5 X |
| 4,705,422 | 11/1987 | Tsui et al. | 403/78 X |
| 4,865,256 | 9/1989 | Durand et al. | |
| 5,048,646 | 9/1991 | Carlsson | 403/90 X |
| 5,101,928 | 4/1992 | O'Connor | |

FOREIGN PATENT DOCUMENTS 0 315 522   5/1989   European Pat. Off. .

*Primary Examiner*—Lynne Reichard
*Assistant Examiner*—John R. Cottingham
*Attorney, Agent, or Firm*—Bacon & Thomas, PLLC

[57] ABSTRACT

A pivot system is disclosed for pivotally connecting a movable component to a fixed component, the pivot system having a swivel device mounted on one of the movable and fixed components, a headed shaft passing through a portion of the other of the movable and fixed components and engaging the swivel device, the headed shaft having a longitudinal axis forming the pivot axis between the components, an anti-rotation device engaging the shaft so as to prevent relative rotation between the shaft and the component to which it is mounted, and an anti-axial movement device engaging the shaft as to prevent relative movement between the shaft and the component to which it is mounted along the longitudinal axis of the shaft. This structure enables the shaft to be installed having access to only one end of the pivot shaft, improving over the known systems in which it is necessary to have access to both ends of the pivot shaft.

11 Claims, 4 Drawing Sheets

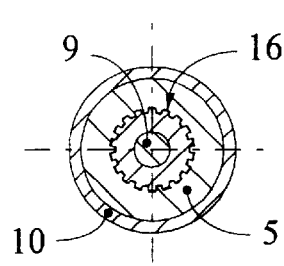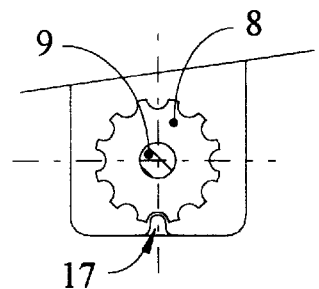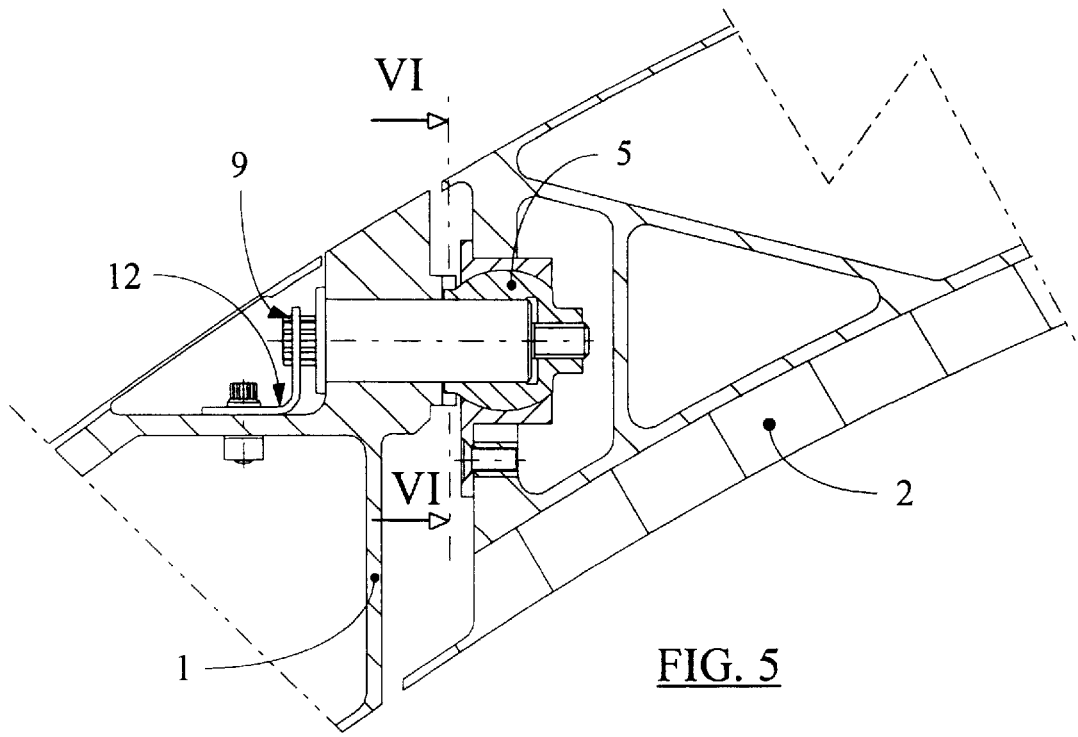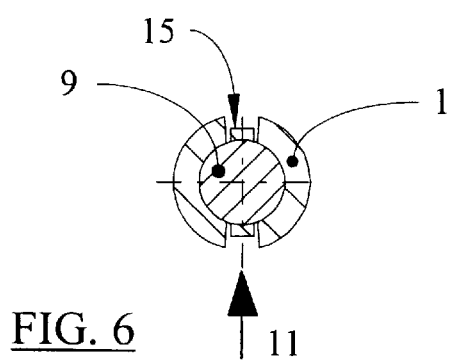

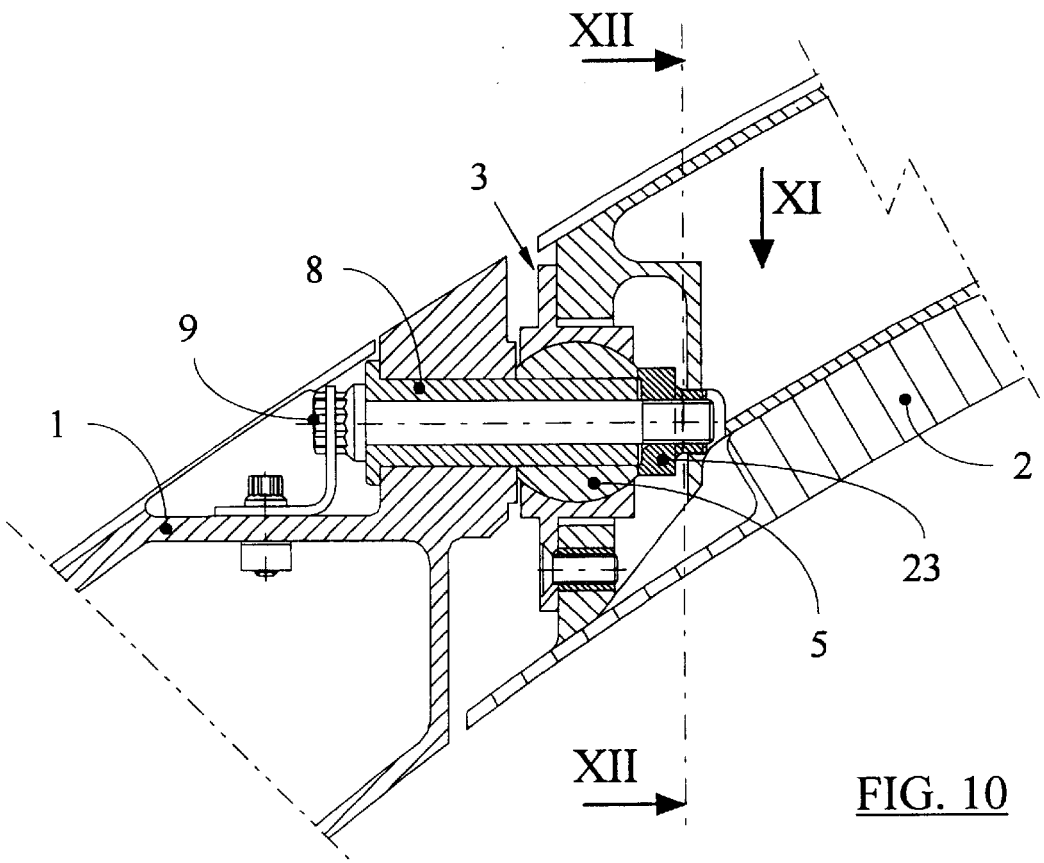
FIG. 10
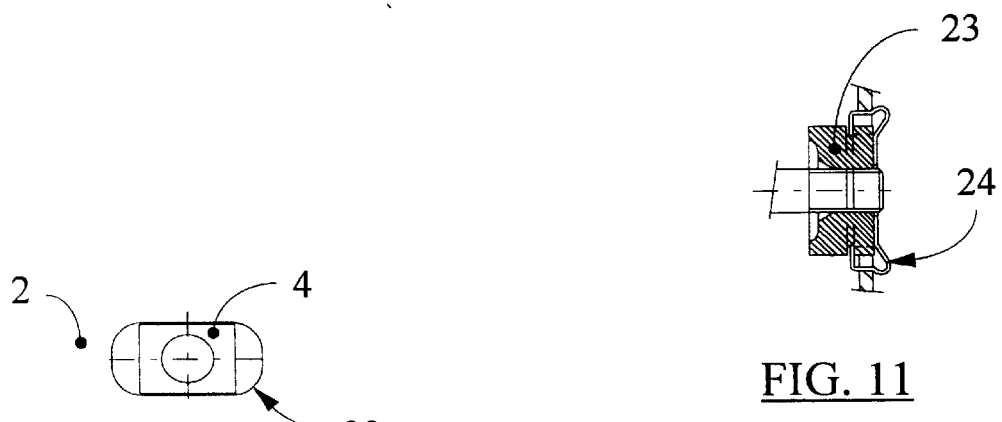
FIG. 9
FIG. 11
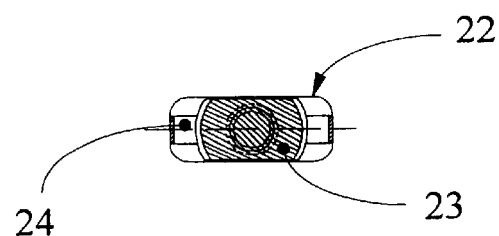
FIG. 12

PIVOT ATTACHMENT FOR A MOVABLE THRUST REVERSER ELEMENT

BACKGROUND OF THE INVENTION

The present invention relates to a pivot system for pivotally connecting a movable component to a fixed component, more particularly such a system for pivotally connecting a movable thrust reverser element to an aircraft cowling.

Turbofan-type turbojet engines are well known in the art and typically comprise a fan located at the front of a turbojet engine, which fan directs a flow of bypass air through a duct bounded by an engine cowling on the inside and a fan cowling on the outside. The generally annular duct bounded by the engine cowling and the fan cowling may channel both the bypass flow and the primary exhaust flow at a downstream portion from the turbojet engine, or the duct may channel only the bypass flow.

In aircraft in which the engine is mounted outside of the airframe structure, the fan cowling and the engine cowling are configured to form boundaries of the bypass flow duct and to provide aerodynamic outer surfaces to reduce drag.

In all types of thrust reversers, a pivot attachment is utilized to pivotally attach the movable thrust reverser component, which may be a door, a cascade flap, a panel, or a rear baffle, to the fixed portion of the aircraft cowling to enable the thrust reverser component to move between forward and reverse thrust positions. FIG. 1 illustrates a known pivot attachment to pivotally connect the movable thrust reverer element 2, in this particular instance a thrust reverser door, to the fixed cowling structure 1. Pivots 2a comprise a shaft, a swivel assembly and a nut. Access hatches 20 and 21 are provided to facilitate access to the external portion of the shaft and to the nut to facilitate the installation of the pivot system. However, this known design incurs many drawbacks. It requires a large number of components, thereby increasing the manufacturing costs, and has several component interfaces which require adjustment and particular attention during the installation process and during later maintenance processes. The areas occupied by the access hatches 20 and 21 are not available for structural reinforcement or acoustic insulation of either the cowling or the thrust reverser door.

SUMMARY OF THE INVENTION

A pivot system is disclosed for pivotally connecting a movable component to a fixed component, the pivot system having a swivel device mounted on one of the movable and fixed components, a headed shaft passing through a portion of the other of the movable and fixed components and engaging the swivel device, the headed shaft having a longitudinal axis forming the pivot axis between the components, an anti-rotation device engaging the shaft so as to prevent relative rotation between the shaft and the component to which it is mounted, and an anti-axial movement device engaging the shaft as to prevent relative movement between the shaft and the component to which it is mounted along the longitudinal axis of the shaft. This structure enables the shaft to be installed having access to only one end of the pivot shaft, improving over the known systems in which it is necessary to have access to both ends of the pivot shaft.

By providing a pivot system requiring access to only one side of the shaft to facilitate installation or removal, one of the access hatches required for the known pivot systems may be eliminated, thereby reducing both manufacturing and maintenance costs. Furthermore, the component from which the access hatch has been removed may have additional structural reinforcement and/or acoustic installation to enhance the operation of the engine.

BRIEF DESCRIPTION OF THE DRAWINGS

FIG. 3 is a cross-sectional view taken along line III—III in FIG. 2.

FIG. 4 is a cross-sectional view taken along line IV—IV in FIG. 2.

FIG. 5 is a partial, cross-sectional view illustrating a second embodiment of the pivot system according to the present invention.

FIG. 6 is a cross-sectional view taken along line VI-VI in FIG. 5.

FIG. 9 is a partial, cross-sectional view taken along line IX—IX in FIG. 8.

FIG. 10 is a partial, cross-sectional view illustrating a fifth embodiment of the pivot system according to the present invention.

FIG. 11 is a cross-sectional view of the attachment nut viewed in the direction of arrow 11 in FIG. 10.

FIG. 12 is a cross-sectional view taken along line XII—XII in FIG. 10.

DETAILED DESCRIPTION OF THE PREFERRED EMBODIMENTS

Figure 1:
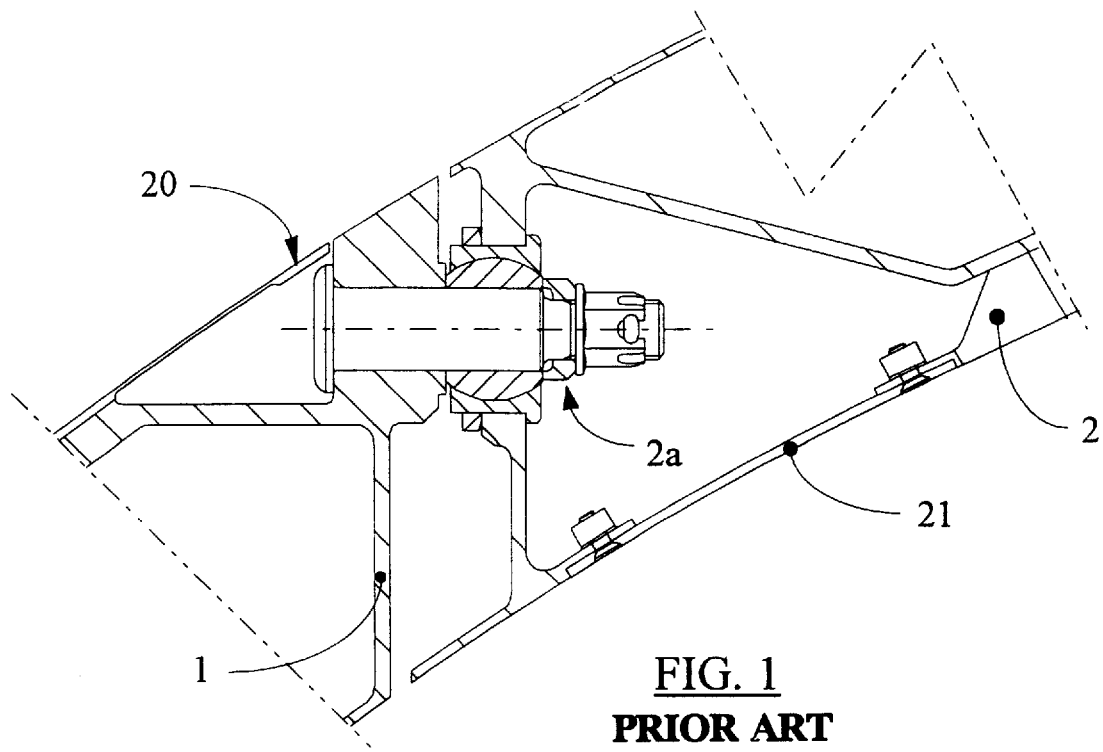
FIG. 1 is a partial, cross-sectional view illustrating a known pivot system.
Figure 2:
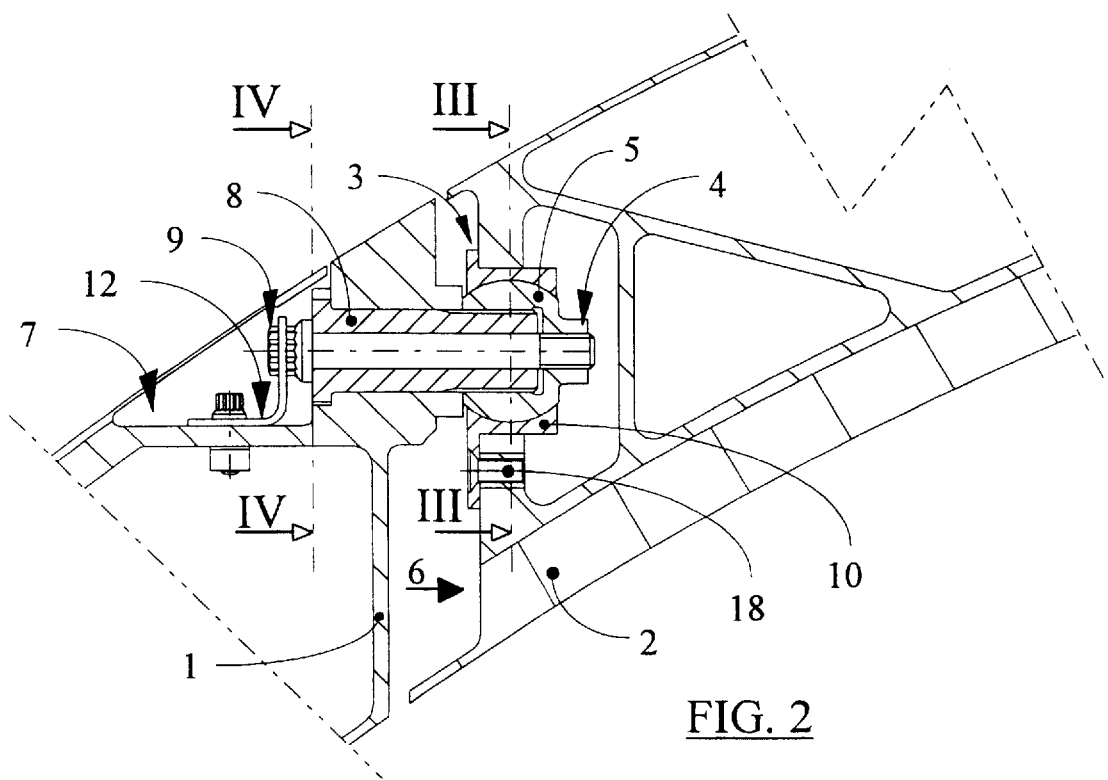
FIG. 2 is a partial, cross-sectional view illustrating a first embodiment of the pivot system according to the present invention.

The movable component 2 is pivotally attached the fixed component 1 by a first embodiment of the pivot system as illustrated in FIGS. 2–4. As can be seen, the swivel device 3 is mounted on one of the components, in this particular instance, the movable component 2, while a headed shaft assembly, comprising a hollow shaft member 8 and a threaded bolt member 9, is mounted on the other component, in this particular instance the fixed component 1. Although the invention will be described with the swivel device attached to the movable component and the headed shaft attached to the fixed component, it is to be understood that their respective mounting positions could be reversed without exceeding the scope of this invention. The swivel device 3 is attached to the movable component by any known means, such as screw 18. The swivel device 3 may comprise a swivel member 10 having an off-center configuration relative to the movable component 2 thereby facilitating the alignment of the movable component 2 and the fixed component 1 by rotation of the swivel member 10 prior to fixing it in place.

The hollow shaft member 8 is mounted within a hole in the fixed component 1, the shaft member being dimensioned so as to transmit the stresses imparted thereon by the movable component 2 to the fixed component 1. An inner end of the hollow shaft member 8 has a non-circular cross-sectional configuration which engages a correspondingly shaped opening formed in the swivel member 5 such that the swivel member 3 is non-rotatably affixed to the shaft member 8. A nut 4 is, in this particular embodiment, integrally formed with the swivel member 5 such that the threaded opening of the nut is in alignment with the opening through the hollow shaft member 8. Thus, as can be seen in FIG. 2, insertion of the threaded bolt member 9 through the hollow shaft member 8 into engagement with the nut 4 may be achieved by having access to only one side of the shaft assembly, since the nut 4 and swivel member 5 are non-rotatably mounted on the end of hollow shaft member 8. By tightening the bolt member 9, the movable component 2 is pivotally attached to the fixed component 1, such pivoting movement taking place by relative movement between the swivel members 10 and 5. The movable component 2 pivots around the longitudinal axis of the hollow shaft member and the bolt member relative to the fixed component 1.

FIG. 3 illustrates the engagement between the end of the hollow shaft member 8 and the internal opening of the swivel member 5 so as to non-rotatably affix these elements together. In this particular illustration, axially extending splines are utilized to prevent such relative rotation. However, it is understood that other configurations may be utilized as long as the goal of relative non-rotation is achieved.

Axial movement between the shaft assembly and the swivel assembly is prohibited by the threaded engagement between the bolt member 9 and the nut 4. Rotation of the bolt member 9 relative to the component to which it is mounted, in this particular instance fixed component 1, is achieved by a bracket 12 attached to the movable component 1 in an access area 7 and engaging the headed portion of the threaded bolt member 9 so as prevent rotation of the threaded bolt member 9 relative to the movable component 1. Rotation of the hollow shaft member 8 relative to the fixed component 1 is also prevented by one or more projections 17 formed on the fixed component 1 engaging one or more radial notches formed in a head portion of the hollow shaft member 8, as best illustrated in FIG. 4.

In FIGS. 5 and 6, an alternative embodiment is illustrated in which the threaded bolt member 9 is made sufficiently large so as to be capable of absorbing the stresses imposed thereon by movement of the movable component 2, thereby enabling the hollow shaft member to be eliminated. As in the previous embodiment, the end of the bolt element thread-ingly engages a nut 4 formed integrally with the swivel member 5. The interior surface of the opening in the swivel member 5 which is engaged by an end of the threaded member 9 must be such to permit relative rotation between these elements to enable the bolt member 9 to be threaded into the nut 4. Rotational movement of the swivel member 5 relative to the fixed component 1 is prevented, in this embodiment, by the engagement of one or more protrusions 15, extending from the swivel member 5 into a slot formed in a surface of the fixed component 1 adjacent to the swivel member 5, as illustrated in FIGS. 5 and 6. The slot is oriented so as to facilitate assembly of the movable component 2, which already has the swivel members 5 and 10 mounted thereon mounted, into the affixed component 1 in the direction of arrow 11 prior to the insertion of the threaded shaft member 9. Once the threaded member 9 is in position, axial movement is prevented by its engagement with the nut 4, while rotational movement relative to the fixed component 1 is prevented by bracket 12, similar to the previously described embodiment.

Figure 7:
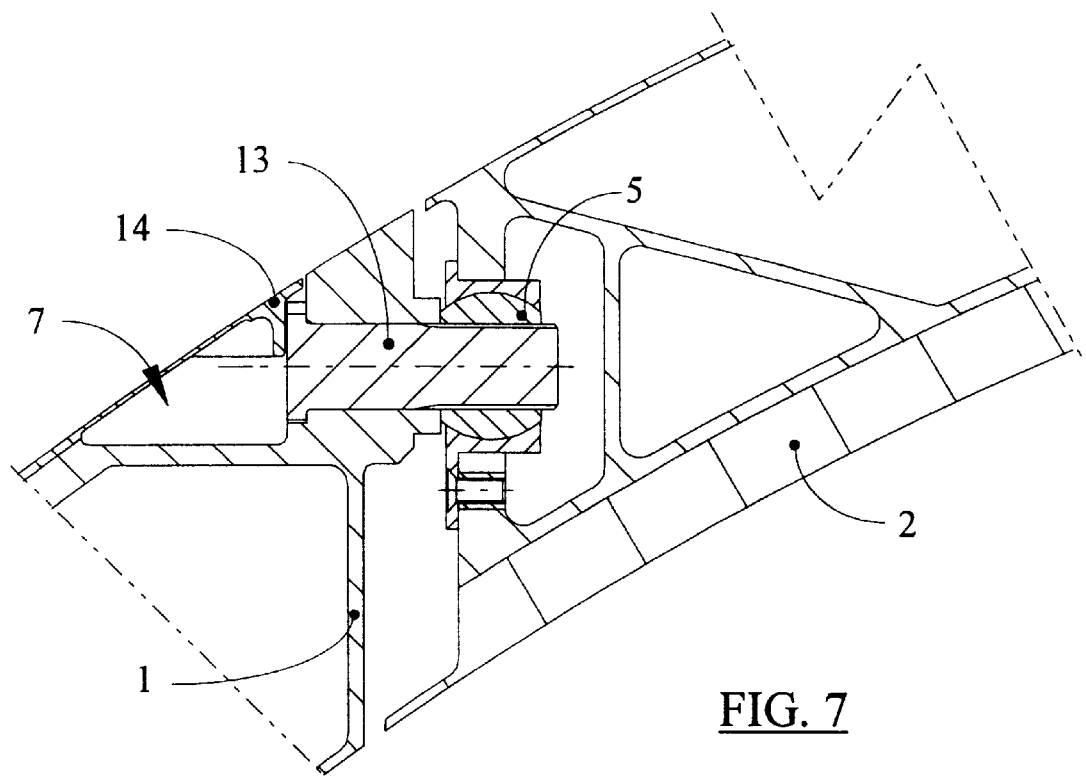
FIG. 7 is a partial, cross-sectional view illustrating a third embodiment of the pivot system according to the present invention.

In the embodiment illustrated in FIG. 7, the shaft 13 again non-rotatably engages the swivel member 5, either by splines, or non-circular complementary cross-sectional configurations. In this embodiment, there is no threaded engagement between the swivel member 5 and the shaft member 13. Rotation of the shaft 13 relative to the fixed component 1 is prevented by the engagement of a projection formed on the fixed component 1 with one or more radial grooves, as illustrated in FIG. 4. Axial movement of the shaft member 13 relative to the fixed component 1 is prevented by a projection from the hatch 14 covering the access area 7 which engages the outermost surface of the head of the shaft member 13.

Figure 8:
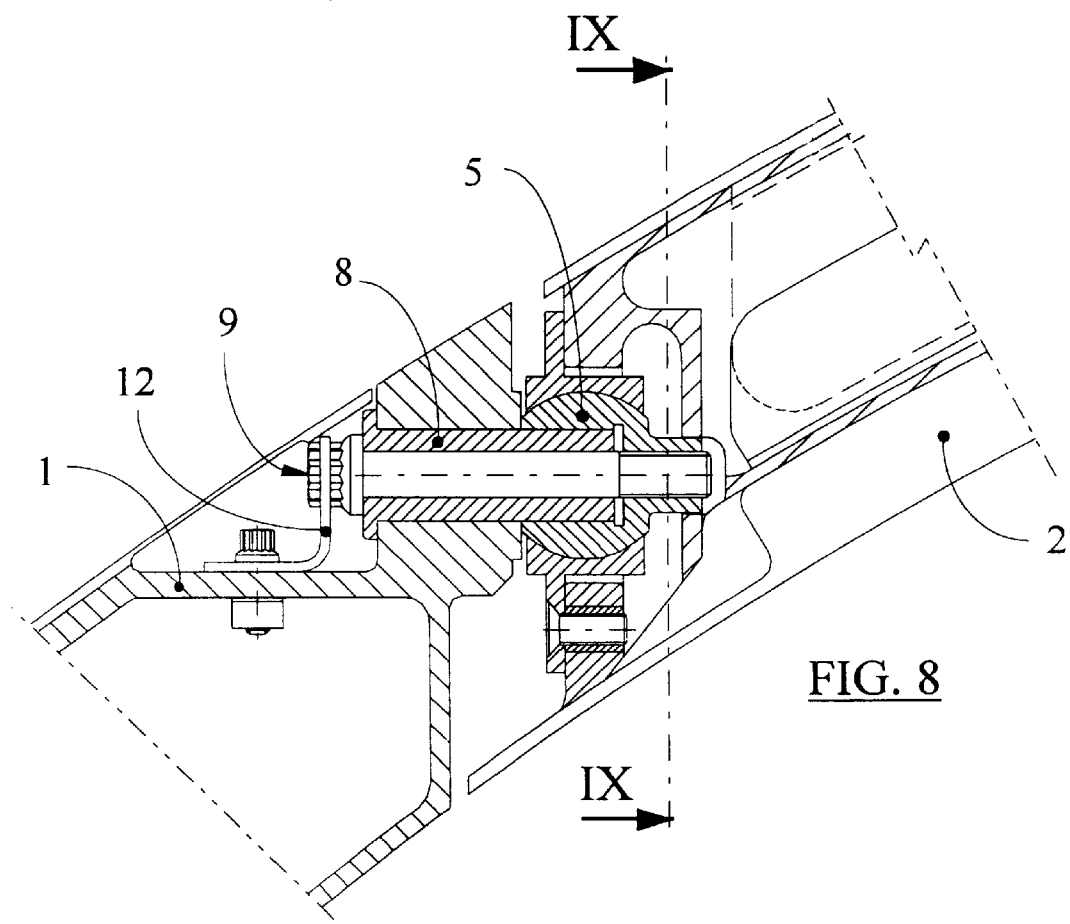
FIG. 8 is a partial, cross-sectional view illustrating a fourth embodiment of the pivot system according to the present invention.

In the embodiment illustrated in FIGS. 8 and 9, the nut 4 is, again, formed integrally with the swivel member 5 and is positioned in a recess 22 formed in a portion of the movable component 2, the geometry of the recess precluding relative rotation of the nut 4. The recess may, alternatively, be replaced by a stop affixed to the adjacent portion of the movable component 2. A clearance may be provided between the nut 4 and the recess 22 to facilitate a slight differential movement between these components.

FIGS. 10–12 illustrate an alternative embodiment of the invention in which nut 23 is separate from the swivel member 5. A recess 22 is formed in an adjacent portion of the movable component 2 and is engaged by a portion of the nut 23 so as to prevent relative rotation between the nut 23 and the movable component 2. Otherwise, this embodiment is identical to the embodiment illustrated in FIGS. 2–4. A system for holding the nut 23 within the recess 22 may also be incorporated into this embodiment. Any known type of holding means, such as spring clip 24 illustrated in FIGS. 11 and 12, may be utilized to hold the nut 24 in position while, at the same time, allowing slight movement between the nut 23 and its surrounding structure to facilitate insertion of the threaded end of the threaded bolt member 9. Although a hollow shaft member 8 with a separate threaded bolt member 9 is illustrated in this, as well as the previously described embodiment, it is to be understood that this assembly may be replaced by the single threaded member illustrated in the embodiment of FIG. 5.

All of the embodiments of the present invention have been described and illustrated with the access side of the pivot system facing towards the outer side of the fixed component 1. It is to be understood, however, that access may be provided through the movable component 2 without exceeding the scope of this invention.

The foregoing description is provided for illustrative purposes only and should note be construed as in any way limited this invention, the scope of which is defined solely by the appended claims.

I claim:

1. A turbojet-engine thrust reverser with a pivot system rotationally pivotally connecting a movable component of the thrust reverser to a fixed component of the thrust reverser, comprising:

a movable component of the thrust reverser:

a fixed component of the thrust reverser;

a swivel device including a first swivel member connected to one of the movable and fixed components and a second swivel member located in the first swivel member;

a headed shaft passing through a portion of the other of the movable and fixed components, and engaging the second swivel member of the swivel device, the headed shaft having a longitudinal axis comprising a pivot axis between the fixed and movable components;

an anti-rotation device engaging the shaft so as to prevent relative rotation between the shaft and the other of the movable and fixed components; and an anti-axial movement device engaging the shaft so as to prevent relative movement between the shaft and the other of the movable and fixed components along the longitudinal axis of the shaft, whereby the shaft is installed with access to only one side of the shaft.

2. The turbo jet-engine thrust reverse with the pivot system of claim 1 wherein the first swivel member is fixedly attached to one of the moveable and fixed components.

3. The turbo jet-engine thrust reverse with the pivot system of claim 1 wherein the anti-rotation device and the anti-axial movement device engage a head of the headed shaft.

4. The turbo jet-engine thrust reverse with the pivot system of claim 1 wherein the headed shaft non-rotatably engages the second swivel member.

5. The turbo jet-engine thrust reverse with the pivot system of claim 4 further comprising:
   a) an opening in the second swivel member having a non-circular cross-sectional configuration; and,
   b) a portion of the headed shaft located in the opening, the portion having a cross-sectional configuration complementary to that of the opening.

6. The turbo jet-engine thrust reverser with the pivot system of claim 5 wherein the opening and the portion of the headed shaft have engaging axially extending splines.

7. The turbo jet-engine thrust reverser with the pivot system of claim 1 wherein the anti-axial movement device comprises a nut threadingly engaged with an end of the shaft, the nut located on a side of the second swivel member opposite from a head of the headed shaft.

8. The turbo jet-engine thrust reverser with the pivot system of claim 7 wherein the nut non-rotatably engages the same one of the movable and fixed components to which the first swivel member is attached.

9. The turbo jet-engine thrust reverser with the pivot system of claim 7 wherein the nut comprises an integral portion of the second swivel member.

10. The turbo jet-engine thrust reverser with the pivot system of claim 9 wherein the second swivel member engages the other of the fixed and movable components so as to prevent relative rotation therebetween.

11. The turbo jet-engine thrust reverser with the pivot system of claim 7 wherein the shaft comprises:
   a) a hollow shaft member engaging the second swivel member and having the head thereon; and, b) a threaded bolt member passing through the hollow shaft member and engaging the nut, the bolt member having a head portion.

* * * * *

UNITED STATES PATENT AND TRADEMARK OFFICE
CERTIFICATE OF CORRECTION

PATENT NO. : 5,947,625
DATED : September 7, 1999
INVENTOR(S) : Guy Bernard Vauchel It is certified that error appears in the above-identified patent and that said Letters Patent is hereby corrected as shown below:

Column 4, line 54; change ":" to --;--
Column 5, line 6; change "reverse" to --reverser--
Column 5, line 9; change "reverse" to --reverser--
Column 5, line 13; change "reverse" to --reverser--
Column 5, line 16; change "reverse" to --reverser--

Signed and Sealed this

Nineteenth Day of September, 2000

Attest:

Q. TODD DICKINSON

*Attesting Officer*  *Director of Patents and Trademarks*